(12) United States Patent
Cho (10) Patent No.: US 8,009,064 B2
(45) Date of Patent: Aug. 30, 2011

(54) DATA INPUT DEVICE FOR PORTABLE TERMINAL

(75) Inventor: Dong-Suck Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 973 days.

(21) Appl. No.: 11/928,888

(22) Filed: Oct. 30, 2007

(65) Prior Publication Data

US 2008/0100478 A1    May 1, 2008

(30) Foreign Application Priority Data

Oct. 30, 2006 (KR) .................. 10-2006-0105664

(51) Int. Cl.
*H03K 17/94* (2006.01)
(52) U.S. Cl. .................. 341/35; 341/20; 345/156
(58) Field of Classification Search .................. None
See application file for complete search history.

(56) References Cited

U.S. PATENT DOCUMENTS

| | | | | |
|---|---|---|---|---|
| 5,448,240 A | * | 9/1995 | Morito | 341/176 |
| 6,188,393 B1 | * | 2/2001 | Shu | 345/184 |
| 6,211,474 B1 | * | 4/2001 | Takahashi | 200/18 |
| 6,292,113 B1 | * | 9/2001 | Wu | 341/20 |
| 6,344,643 B1 | * | 2/2002 | Chen | 250/221 |
| 6,965,782 B1 | * | 11/2005 | Nuovo et al. | 455/550.1 |
| 7,012,201 B2 | * | 3/2006 | Kodani et al. | 200/14 |
| 7,612,305 B2 | * | 11/2009 | Miyoshi et al. | 200/14 |

FOREIGN PATENT DOCUMENTS

| | | |
|---|---|---|
| JP | 2006-185170 | 7/2006 |
| JP | 2006185170 | * 7/2006 |

OTHER PUBLICATIONS

Nishiuchi, Iori, Information Input Device, Publication No. JP 2006-185170 Jul. 13, 2006.*

* cited by examiner

*Primary Examiner* — Brian A Zimmerman
*Assistant Examiner* — Jerold Murphy
(74) *Attorney, Agent, or Firm* — The Farrell Law Firm, P.C.

(57) ABSTRACT

Provided is a data input device which is employed in a portable terminal and used as an auxiliary input device. The data input device includes first data input means mounted on a predetermined position of a side surface of the main body of the portable terminal so that a portion of the first data input means is exposed to the outside, and operating when the exposed portion is rotated; second data input means operating when the exposed portion is pressed; a holding unit for maintaining a stopped state of the first data input means; and an elastic sliding unit for returning the second data input means to an initial position.

9 Claims, 10 Drawing Sheets

DATA INPUT DEVICE FOR PORTABLE TERMINAL

PRIORITY

This application claims priority under 35 U.S.C. §119(a) to an application entitled "Data Input Device For Portable Terminal" filed in the Korean Industrial Property Office on Oct. 30, 2006 and assigned Serial No. 2006-105664, the contents of which are hereby incorporated by reference.

BACKGROUND OF THE INVENTION

1. Field of the Invention

The present invention relates to a portable communication terminal such as a Digital Multimedia Broadcast (DMB) phone, a game phone, a chatting phone, a camera phone, an MP3 phone, a cellular phone, a Personal Communication System (PCS) phone, a Personal Digital Assistant (PDA), a Hand Held Phone (HHP), etc., and more particularly to a data input device by which it is possible to input desired data through rotation or pressing of the input device.

2. Description of the Related Art

Portable communication terminals refer to electronic devices that a user can carry and perform wireless communication with his/her partner. As an example of wireless communication, there are many kinds of functions such as a voice communication function, a message sending function, a file sending function, an image communication function, a camera function, etc. Additionally, portable communication terminals can also play the role of a personal secretary who manages telephone numbers, personal schedules, etc.

Furthermore, portable communication terminals have been developed for compactness, slimness, grip, and lightness in consideration of portability, and to provide multimedia capabilities to allow the user to pursue a wider variety of functions, for example, in regard to entertainment content including games, movies, etc. as an important function of the portable communication terminals. In the future, it is expected that portable communication terminals will tend to be complicated devices having multiple functions including image communication, games, Internet, and a camera, as well as a simple voice communication.

In consideration of portability or convenience of use, conventional portable communication terminals are classified into a bar-type communication terminal or a folder-type communication terminal according to their appearance. The bar-type communication terminal has a bar-type single body on which an input/output device, an antenna apparatus, and a transmitter/receiver are mounted; and the folder-type communication terminal has a folder connected to a bar-type single housing by means of a hinge device in such a manner that the folder can be rotated to fold onto or unfold from the housing. Additionally, portable communication terminals may be classified into a swing-type communication terminal or a sliding-type communication terminal according to the way of opening and closing the terminals. In the swing-type communication terminal, two housings are coupled to each other in a manner such that one housing swings to open or close with respect to the other while facing each other. In the sliding-type communication terminal, two housings are coupled to each other in a manner such that one housing slides to open or close with respect to the other.

In all portable communication terminals as listed above, a User Interface (UI) environment has been optimized in order to input desired data in a more convenient way. A dome switch, which is pressed in a general way to input data, has been employed. Additionally, desired data can be input by rotating a rotation key.

Figure 1:
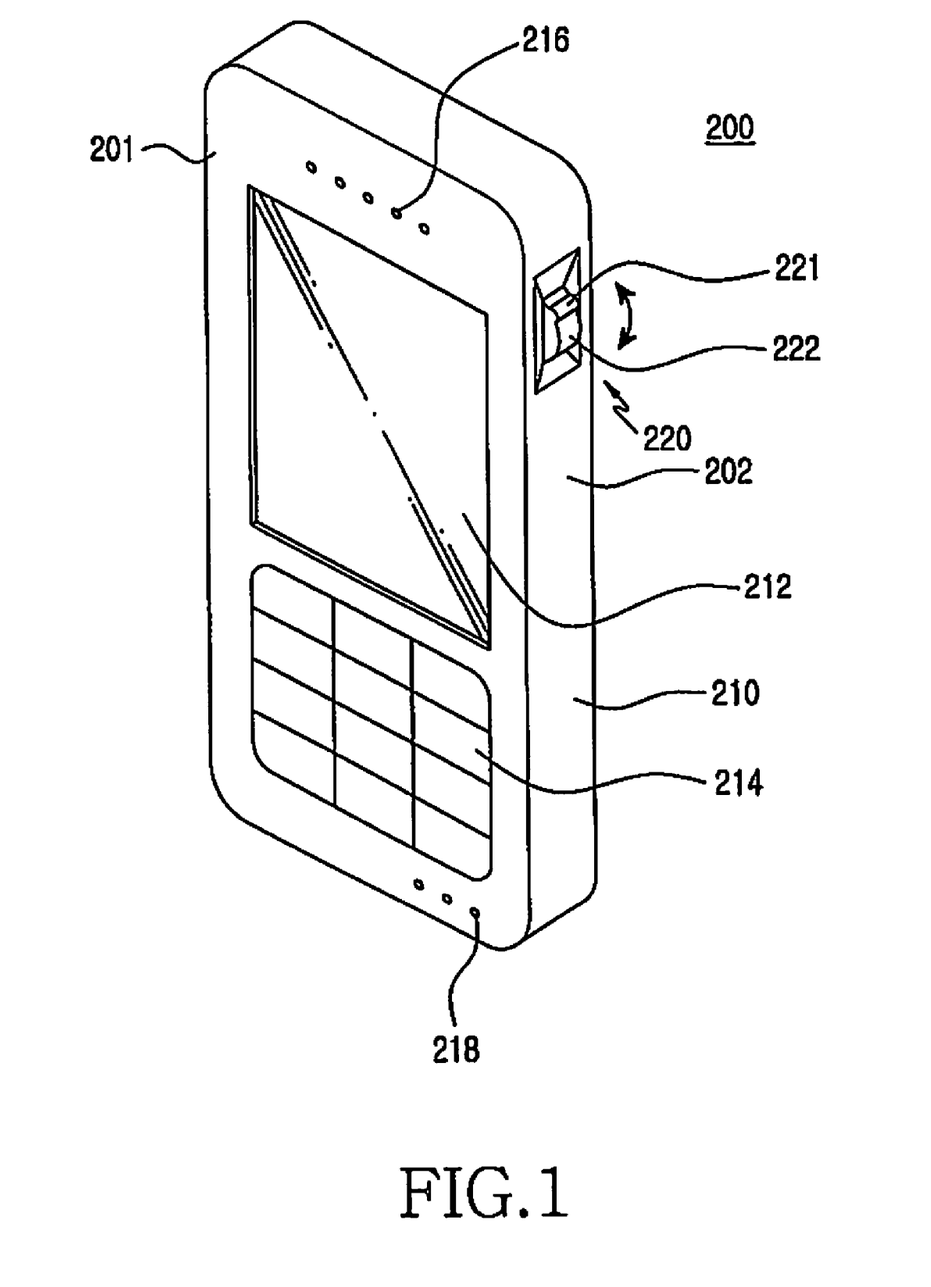
FIG. 1 is a perspective view of a portable terminal according to the conventional art, in which a jog shuttle-key is mounted on a side surface of a main body of the portable terminal.

A configuration of a conventional data input device, which rotates to input data, will be described with reference to FIGS. 1 and 2. A portable communication terminal 200 shown in FIG. 1 is a bar-type terminal. The bar-type portable communication terminal includes a display unit 212, multiple keys 214, a speaker unit 216, and a microphone unit 218, etc., which are mounted on an upper surface of the main body thereof. Additionally, a data input device 220, which is rotated to input data, may be mounted on a side surface 202 of the main body.

Figure 2:
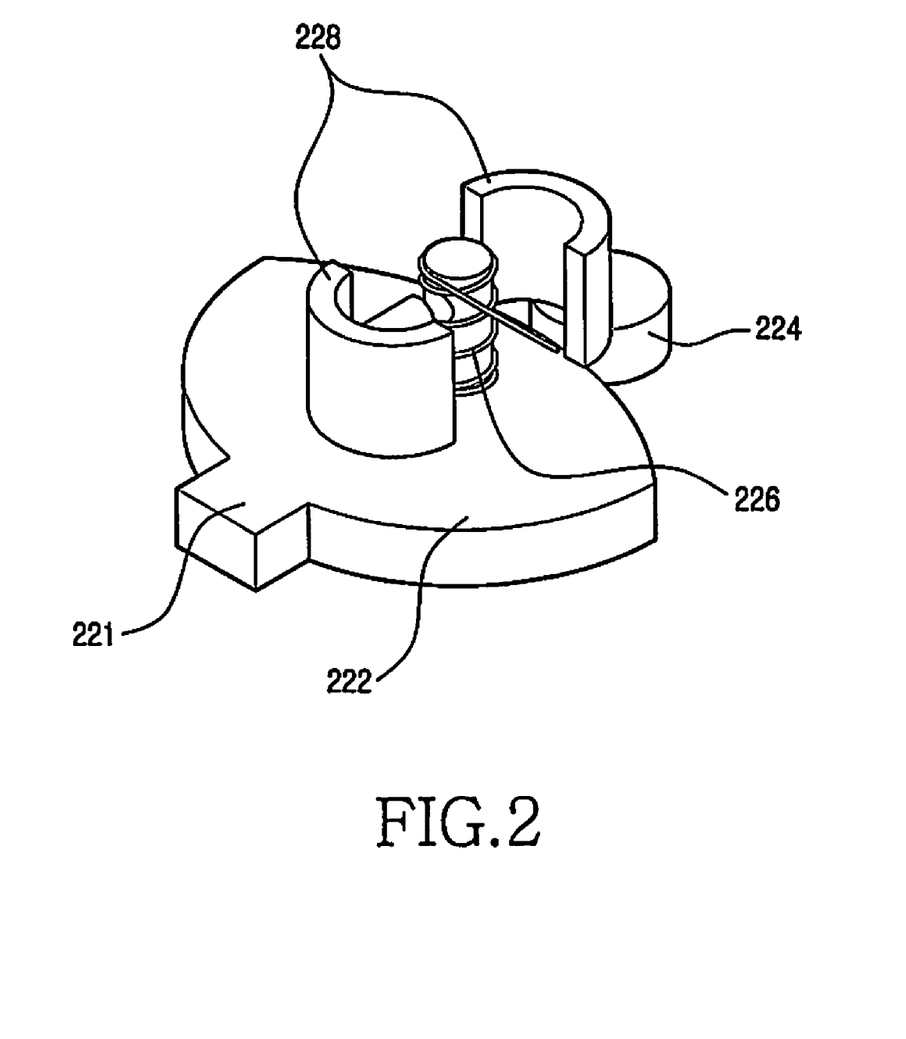
FIG. 2 is an exploded perspective view of a configuration of the jog shuttle-key according to the conventional art.

As shown in FIG. 2, the conventional data input device 220 is an auxiliary data input device, which includes a jog-shuttle key 222 mounted on the side surface 202 of the main body so that a portion of the jog-shuttle key 222, including a protrusion 221, is exposed to the outside, an operating sensor 224 which operates depending on a limited rotation of the jog-shuttle key 222, an elastic body 226 allowing the jog-shuttle key 222 to return to an initial position, and a pair of cases 228 supporting the elastic body 226. The user forcibly rotates the protrusion 221 of the key which is exposed to the outside, so as to input desired data.

However, the data input device used as the conventional auxiliary data input device needs to secure a large mounting space in consideration of the radius of rotation of the key. As a result, this makes it difficult to miniaturize portable communication terminals. Particularly, the conventional data input device has problems in that the range for inputting data is small, due to a limited rotation operation of a key, and that the protruding key causes finger soreness.

SUMMARY OF THE INVENTION

Accordingly, the present invention has been made to solve the above-mentioned problems occurring in the prior art, and the present invention provides a data input device which is useful for miniaturizing a portable terminal.

Also, the present invention provides a data input device which is mounted on a side of a main body, and by which the desired data is input through rotation or pressing of the data input device, resulting in easy operation of inputting data with relation to a UI environment.

Further, the present invention provides a data input device which can be rotated up to an angle of 360 degrees so that various data are input. In addition, the present invention provides a data input device which requires a mounting space having a reduced width (to amount to one-third of that of the conventional device), thereby making it possible to miniaturize a portable terminal.

In accordance with an aspect of the present invention, there is provided a data input device for a portable terminal, which includes a rotation body enclosed by upper and lower cases in such a manner that a portion of the rotation body is exposed to the outside and moves when the rotation body is rotated or pressed; a holding unit for maintaining a stopped state of the rotation body, the holding unit being connected with the rotation body; a first switch unit for inputting data depending on the rotating operation of the rotation body, the first switch unit being in contact with the rotation body; an elastic sliding unit linked with the holding unit for moving along with the holding unit to guide the movement direction of the holding unit when the rotation body is pressed, and returning the rotation body and the holding unit to their initial positions; and a second switch unit for inputting data when the rotation body is pressed.

In accordance with another aspect of the present invention, there is provided a data input device for a portable terminal, which includes a first data input means mounted on a predetermined position of a side surface of the main body so that a portion of the first data input means is exposed to the outside, and operating when an exposed portion is rotated; a second data input means operating when the exposed portion is pressed; a holding unit for maintaining a stopped state of the first data input means; and an elastic sliding unit for returning the second data input means to an initial position.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENTS

Hereinafter, an exemplary embodiment of the present invention will be described in detail with reference to the accompanying drawings. In the following description of the present invention, a detailed description of known functions and configurations incorporated herein is omitted to avoid making the subject matter of the present invention unclear.

Figure 3:
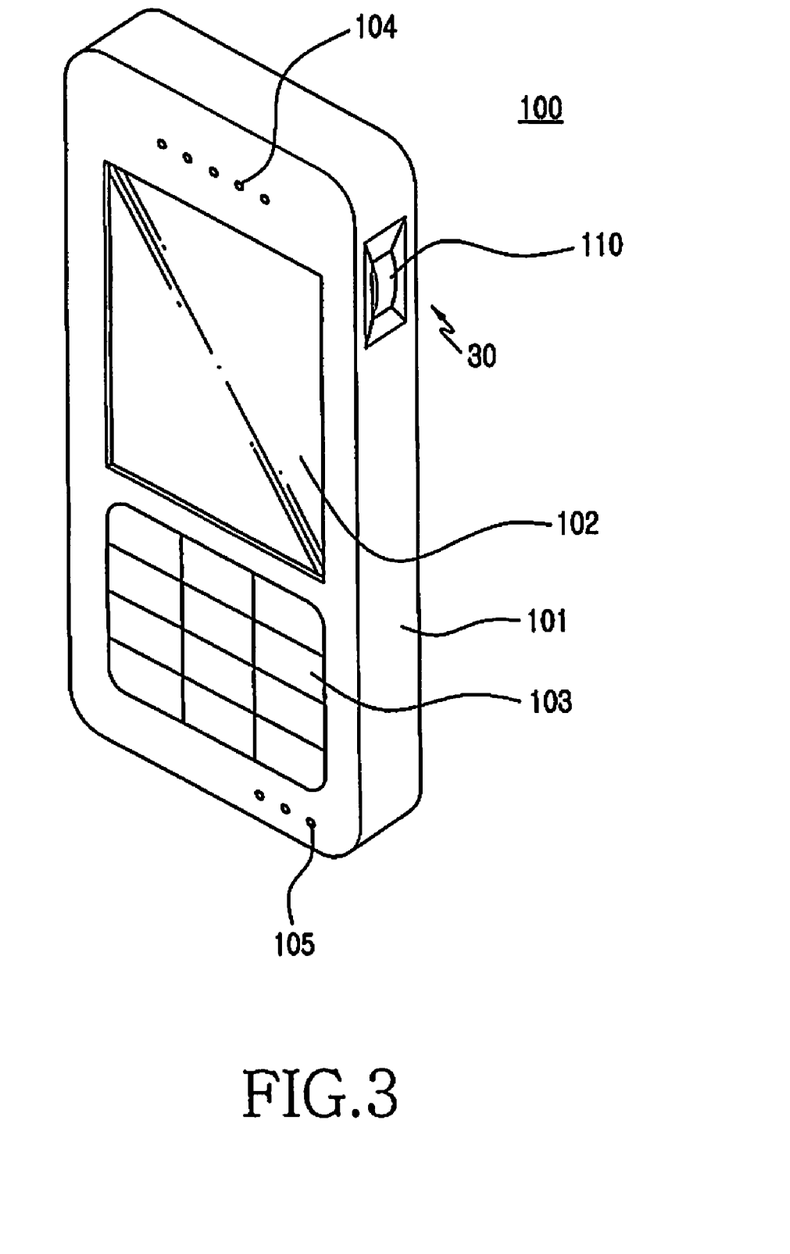
FIG. 3 is a perspective view of a portable terminal according to the present invention, in which a data input device is mounted in place on a side surface of the main body of the portable terminal.
Figure 4:
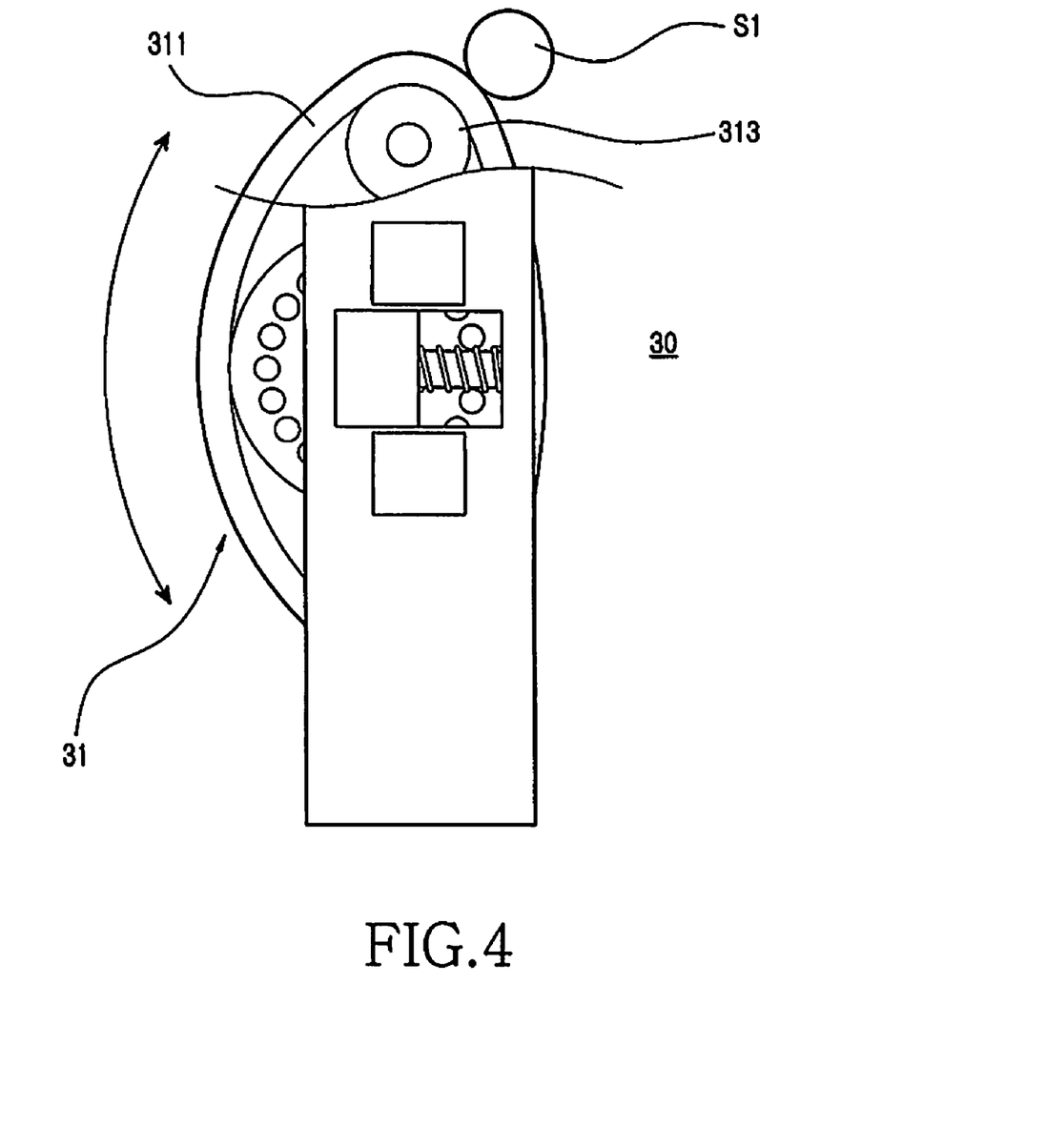
FIG. 4 is a front view of the data input device according to the present invention, in which the data input device is used as a first data input means.
Figure 5:
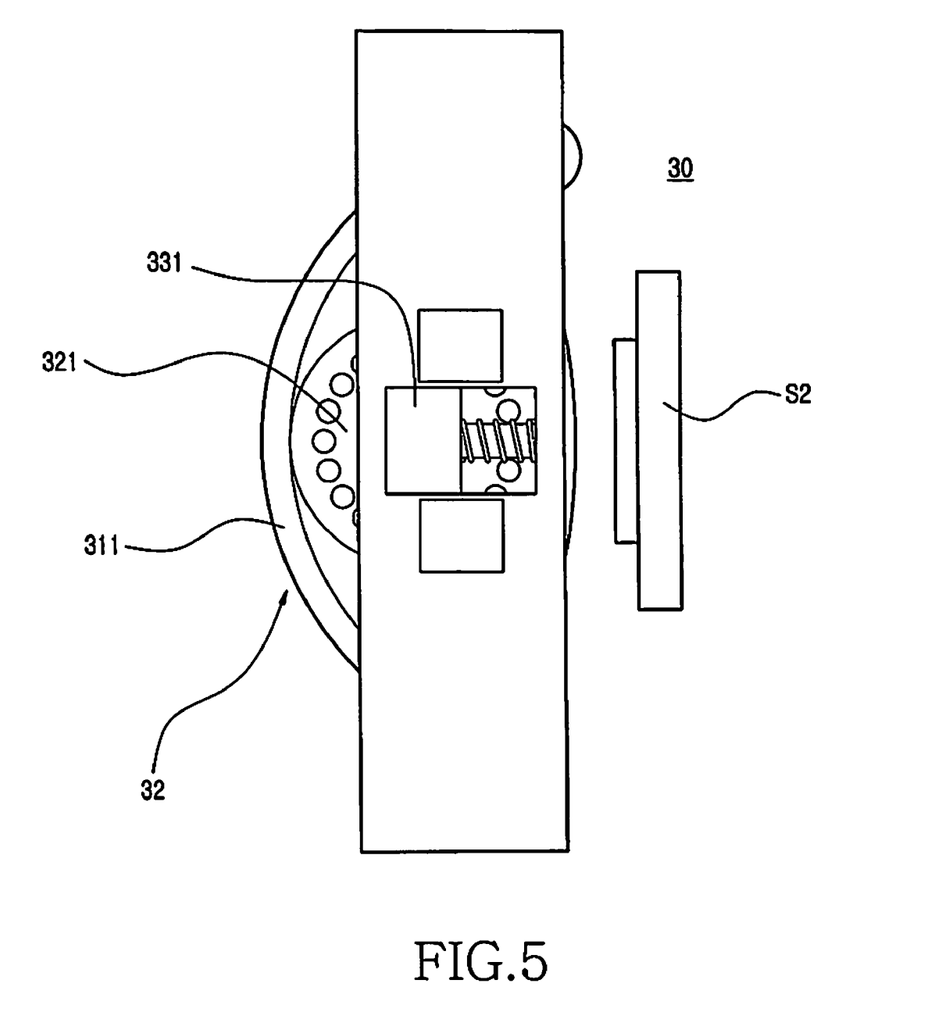
FIGS. 5 and 6 are front and rear views, respectively, of the data input device according to the present invention in which the data input device is used as an auxiliary data input means.
Figure 6:
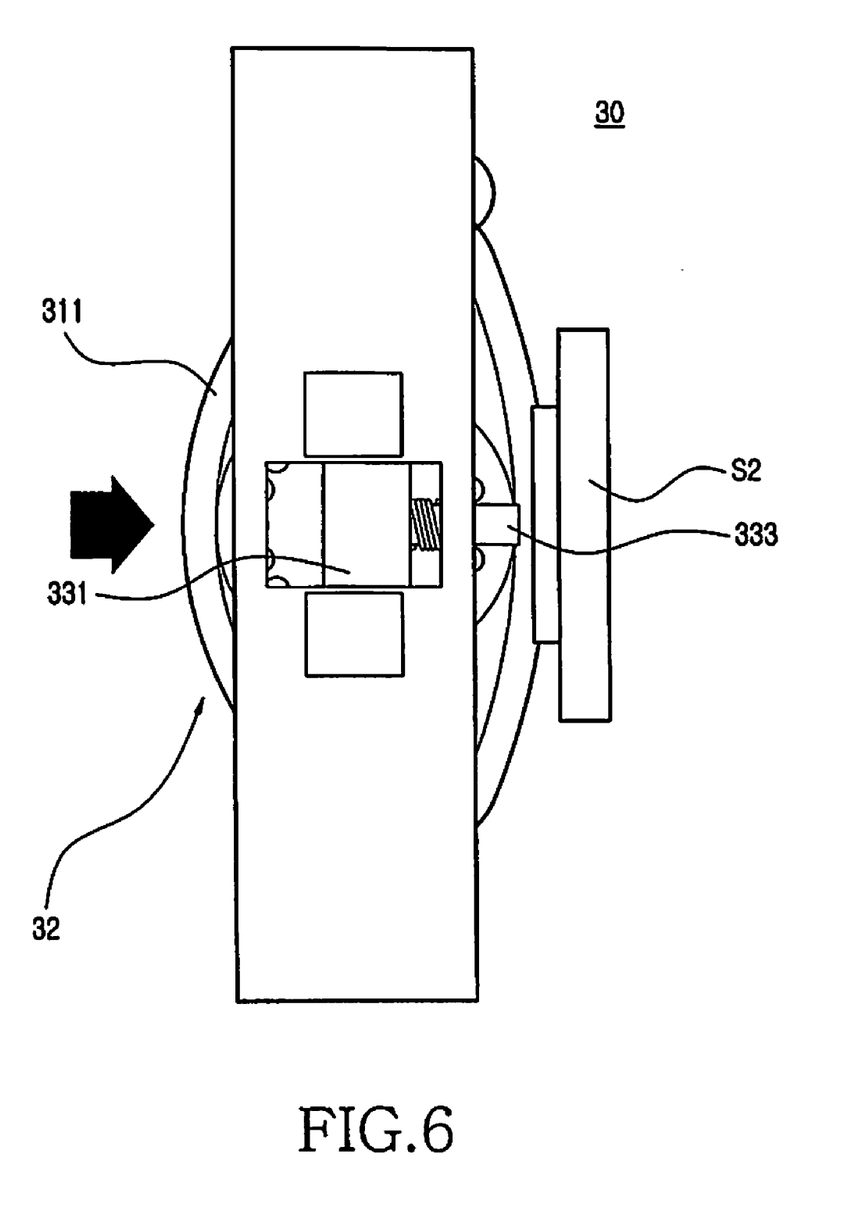

As shown in FIGS. 3 to 6, a data input device 30 according to the present invention includes a first data input means 31 mounted on a side surface of a main body 101 of a portable terminal 100 in such a manner that a portion of the first data input means 31 is exposed to the outside, and an exposed portion is moved by a rotation operation, due to friction force, so that desired data are input, and a second input means 32 in which the exposed portion is pressed so that desired data are input. Of course, the first data input means 31 remains stopped due to a holding unit 320 (FIG. 7), which will be described below, and the second data input means 32 returns to an initial position due to an elastic sliding unit 330 (FIG. 8) which will be described below. Particularly, the first and second data input means 31 and 32 share a rotation body 310 (FIG. 7) which will be described below. Particularly, the first and second data input means 31 and 32 share a belt 311, which will be described below, so that the rotation body 310 is involved in the input operation of the first and second data input means 31 and 32. FIG. 4 shows the configuration of the data input device in which a first switch unit S1 of the first data input means 31 operates, and FIGS. 5 and 6 show the configuration of the data input device before and after, respectively, the operation of the second switch unit S2 of the second data input means 32. The holding unit 320 takes charge of another function for providing auditory information regarding the operation of the first data input means 31

Particularly, the data input device 30 according to the present invention can be rotated by friction force between the data input device 30 and user's fingers and is pressed by user's fingers. The data input device is preferably a side surface mounted-type auxiliary input device which is mounted at a predetermined position on a side surface of the main body 101.

As shown in FIG. 3, a portable communication terminal 100 includes a display unit 102, multiple keys 103, a speaker unit 104, and a microphone unit 105, which are properly mounted on an upper surface of the main body 101 of the portable communication terminal 100. Additionally, the data input device 30, according to the present invention, by which desired data is input by rotation or pressing of the data input device 30, is mounted on a side surface of the main body 101. In the data input device 30, according to the present invention, a portion of a belt 311 described below is arranged in an opening formed in a side surface of the main body in such a manner that the portion is exposed to the outside.

Figure 7:
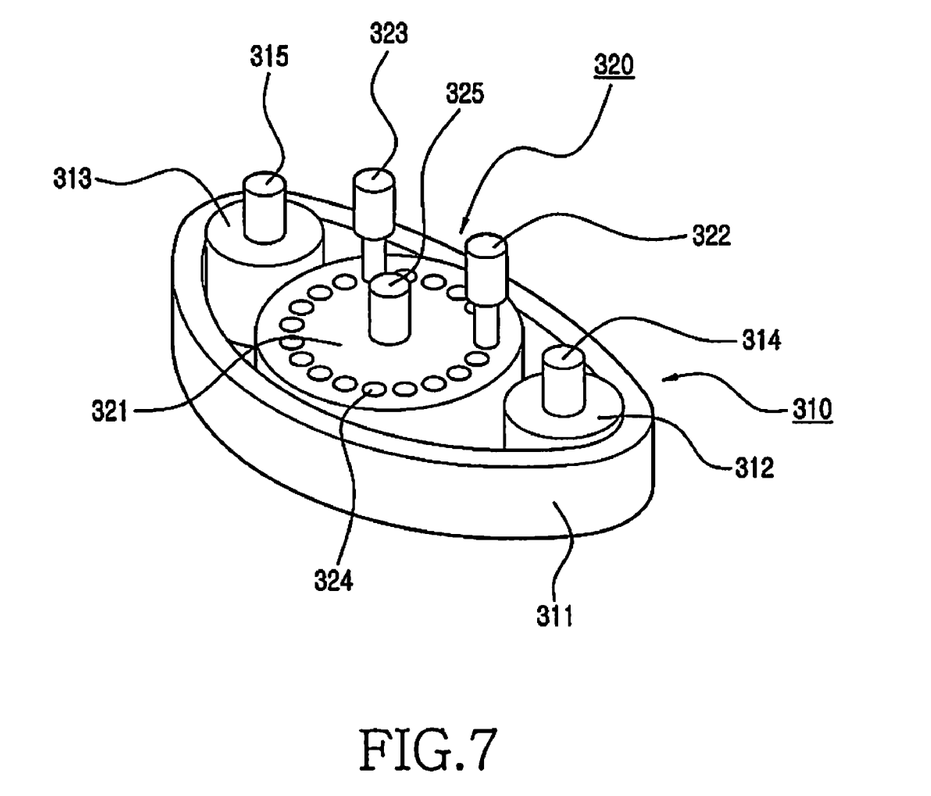
FIG. 7 is a perspective view of a rotation body and a holding unit of the data input device according to present invention.
Figure 8:
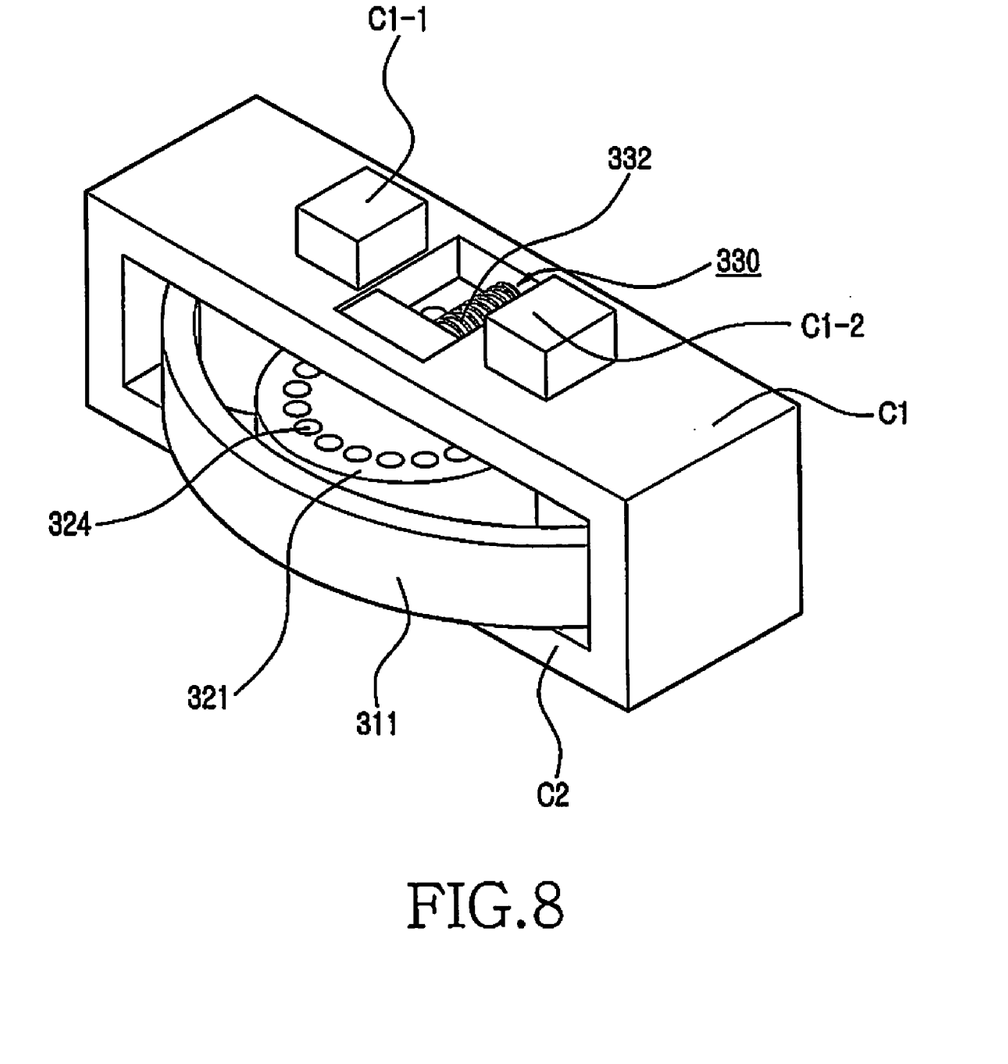
FIG. 8 is a perspective view of the appearance of the data input device according to the present invention, in which the data input device is assembled with upper and lower cases.
Figure 9:
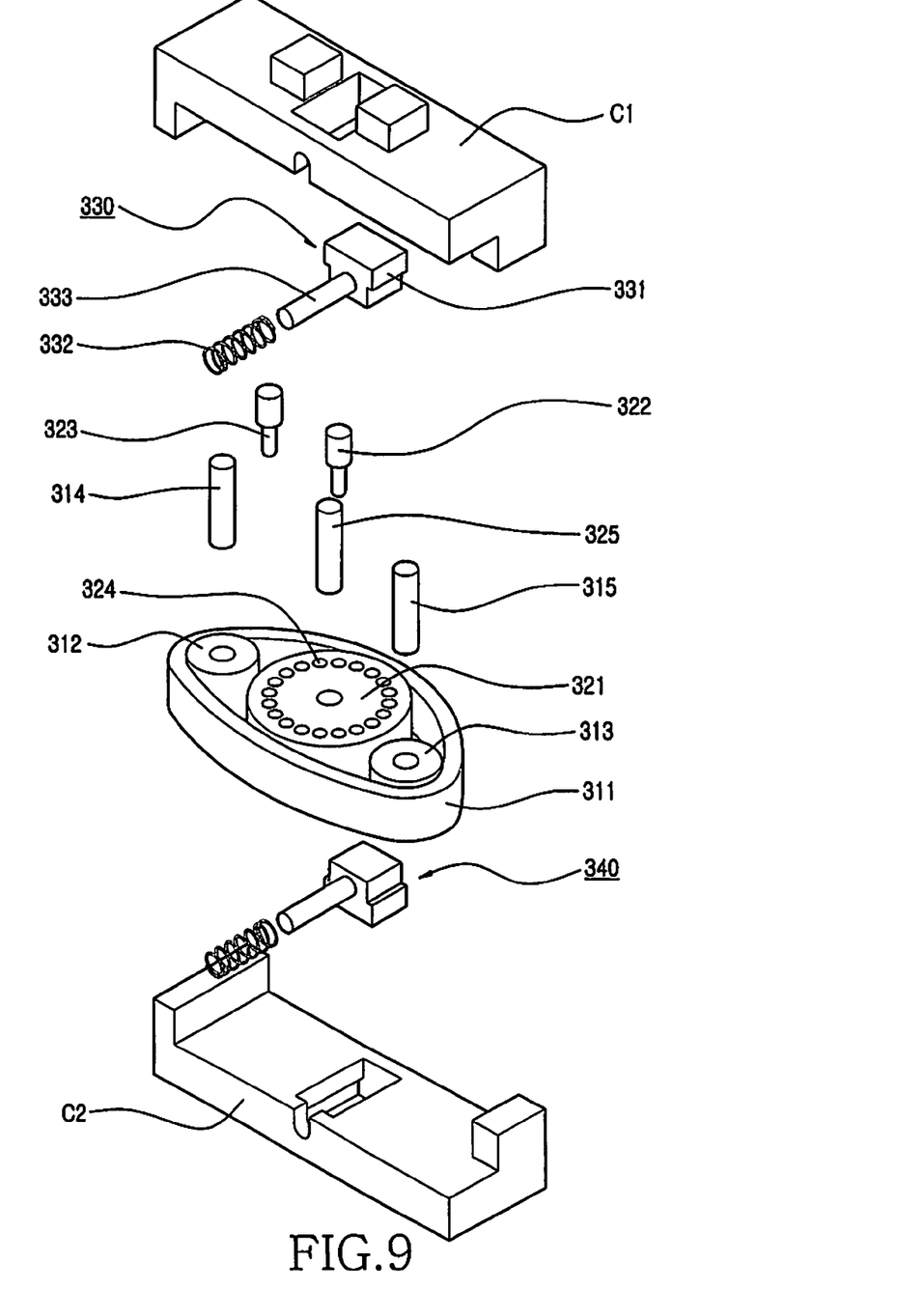
FIG. 9 is an exploded perspective view of the data input device according to the present invention.

As shown in FIGS. 7 to 9, the data input device 30 according to the present invention includes the rotation body 310, the first and second switch units S1 and S2 (FIGS. 4 to 6) which operate, respectively, as the rotation body 310 is rotated (FIG. 4) or is pressed (FIG. 6), a holding unit 320 keeping a stopped state of the rotation body 310, and the elastic sliding unit 330 for returning the rotation body 310 and the holding unit 320 to their initial positions.

The rotation body 310 is a rotating element, which is covered with upper and lower independent cases C1 and C2 and is mounted on a side surface of the main body, in such a manner that a portion of the rotation body 310 is exposed to the outside. The rotation body 310 is rotated and pressed by a user's force. Particularly, the rotation body 310 is rotated so as to operate the first switch unit S1. Alternately, the rotation body 310 is pressed so as to operate the second switch unit S2.

The rotation body 310 includes the belt 311 and belt pulleys 312 and 313. The belt 311 is mounted in such a manner that a portion thereof is exposed to the outside. The belt 311 moves when the user rotates the belt 311, using friction force, or presses the belt 311. The belt pulleys 312 and 313 are configured in a pair and are mounted in such a manner that peripheral surfaces thereof are engaged with the inner surface of the belt 311. When the belt 311 rotates, the pair of the belt pulleys 312 and 313 rotate in the same direction as the rotation direction of the belt 311. The belt pulleys 312 and 313 are rotatably fixed in such a manner that the shafts 314 and 315 thereof are mounted between the upper and lower cases C1 and C2.

The holding unit 320 is linked to and in contact with an inner surface of the belt 311, so as to maintain the stopped state of the rotation body 310, and is arranged in such a manner of being located in the interior of the belt 311 to rotate along with the belt 311. The holding unit 320 is rotated as the belt 311 is rotated, and is pressed as the belt 311 is pressed. The holding unit 320 is arranged in an interior of the rotation body 310 in such a manner of being engaged therewith to move depending on the movement of the rotation body 310. The holding unit 320 includes a serrated belt pulley 321 having multiple openings 324 formed on an upper surface of the serrated belt pulley 321 at equal intervals along an outer peripheral surface of the serrated belt pulley 321, and at least one of spring modules 322 and 323 is in close contact with the serrated belt pulley while being opposed to the openings, or coupled with one of the openings to maintain the stopped state of the rotation body 310, and which can provide auditory information regarding the rotation operation of the rotating body 310 at a certain interval. The serrated belt pulley 321 can be rotated by a shaft 325 in the upper and lower cases C1 and C2, and moved when the rotation body 310 is pressed. Additionally, the serrated belt pulley 321 has the shaft 325 which is integrally assembled with the elastic sliding unit 330 so that the serrated belt pulley 321 moves along with the elastic sliding unit 330. Particularly, when the user rotates the rotation body 310, specifically, a certain portion of the belt 311 by using rotation force, the serrated belt pulley 321 rotates along with the belt 311, and, alternately, when the user presses the certain portion of the belt 311, the serrated belt pulley 321 is pressed along with the belt 311.

A pair of protruded portions C1-1 and C1-2 of the upper case C1 are formed so that the spring modules 322 and 323 are perpendicularly mounted.

Figure 10:
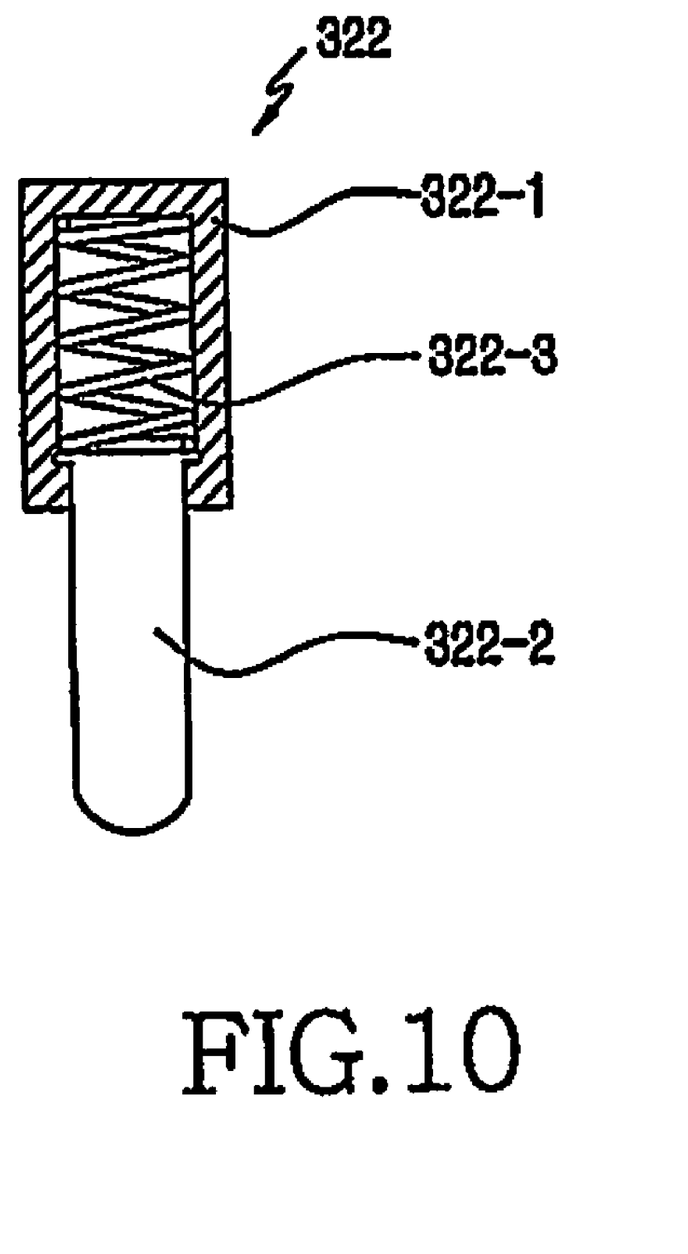
FIG. 10 is a sectional view of the spring module employed in the data input device according to the present invention.

As shown in FIG. 9, the spring modules 322 and 323, in a pair, are in close contact with the serrated belt pulley 321 perpendicularly. As shown in FIG. 10 the spring module 322 includes a first cylindrical housing 322-1, an elastic body 322-3 received into the first cylindrical housing 322-1, and a second cylindrical housing 322-2 supported by the elastic body 322-3 to be inserted into/withdrawn from the first cylindrical housing 322-1. An outer end of the second cylindrical housing 322-2 has a dome shape so as to be selectively coupled to or released from the openings 324 depending on the rotation operation of the rotation body 310.

Referring to FIGS. 7 to 9 again, the elastic sliding units 330 and 340 are linked with the holding unit 320, and, when the rotation body 310 is pressed, move along with the holding unit 320 to guide the movement direction of the holding unit 320 so as to return the rotation body 310 and the holding unit 320 to their initial positions. The elastic sliding units 330 and 340 are, in a pair, safely mounted in openings which are formed on the upper and lower cases C1 and C2, respectively; and, particularly, symmetrically mounted on the openings in up and down directions. The respective elastic sliding units 330 and 340 are integrally assembled with the serrated belt pulley 321, and include a slider 331 moving along with the rotation body 310 when it is rotated, a shaft unit 333 which is integrally coupled to the slider 331, in such a manner of extending in a sliding direction of the slider 331, so as to press the second switch unit S2 when the rotation body 310 is pressed, and an elastic body 332 is arranged to cover an outer circumferential surface of the shaft 333, so as to return the slider 331 to an initial position. The elastic body 332 includes a compressed coil spring. The configuration of the elastic sliding unit 340 is the same as the configuration of the elastic sliding unit 330.

At this time, the rotation body 310 is rotated in a direction perpendicular to a direction in which the rotation body 310 is pressed, and the rotation body 310 is preferably pressed in a radial direction of the serrated belt pulley 321. The rotation body 310 is pressed in a direction into the main body.

Hereinafter, the operation of rotating the rotation body 310 will be described with reference to FIG. 4. When the user applies force to a certain portion of the belt 311 of the rotation body 310, the belt 311 rotates along with the pair of belt pulleys 312 and 313 to operate the first switch unit S1. The first switch unit S1 includes an operating sensor.

The operation of pressing the rotation body 310 will be described with reference to FIGS. 5 and 6. When the user presses a certain portion of the belt 311, a pressed portion of the belt 311, the serrated belt pulley 321, and the slider 331 move in a direction towards the second switch unit S2. When the user continuously presses the belt 311, the shaft 333 presses and operates the second switch unit S2. The second switch unit S2 preferably includes a dome switch, such as a metal dome switch, which is pressed to operate. When the user stops pressing the belt 311, the pressed portion of the belt 311, the serrated belt pulley 321, and the slider 331 return to their initial positions.

The data input device constituted as described above, according to the present invention, preferably has an elongated shape so as to be advantageously mounted on the side of the main body, and is separately assembled so as to be easily mounted on the side of the main body.

While the invention has been shown and described with reference to predetermined exemplary embodiments thereof, the present invention is mounted on the side of the main body, by which the desired data are input through rotation or pressing of the present invention, resulting in easy operation of inputting data with relation to a UI environment. The belt can be rotated up to an angle of 360 degrees so that various data are input, and the present invention is configured in an elongated shape so as to secure a mounting space having a reduced width (to amount to one-third of that of the conventional device), thereby making it possible to miniaturize a portable terminal.

What is claimed is:

1. A data input device for a portable terminal having a main body, the device comprising:
    a rotation body enclosed by upper and lower cases in such a manner that a portion of the rotation body is exposed to the outside of the main body and moves when the rotation body is rotated or pressed;
    a holding unit for maintaining a stopped state of the rotation body, the holding unit being connected with the rotation body;
    a first switch unit for inputting data as a result of a rotating operation of the rotation body, the first switch unit being in contact with the rotation body;
    an elastic sliding unit linked with the holding unit for moving along with the holding unit to guide the movement direction of the holding unit when the rotation body is pressed, and returning the rotation body and the holding unit to their initial positions; and
    a second switch unit for inputting data when the rotation body is pressed, wherein the holding unit comprises a serrated belt pulley in contact with an interior of the rotation body to move along with the rotation body depending on movement of the rotation body and having multiple openings formed in an upper surface of the serrated belt pulley at equal intervals along an outer peripheral surface of the serrated belt pulley; at least one spring module in contact with the serrated belt pulley while being parallel to the serrated belt pulley's axis of rotation and opposed to the openings, said at least one spring module being coupled with one of the openings to maintain a stopped state of the rotation body at a certain interval.

2. The data input device for the portable terminal as claimed in claim 1, wherein the rotation body comprises a belt having a portion exposed at a predetermined position of the main body, and the rest of the belt is arranged in the main body to be forcibly rotated or pressed; and at least one belt pulley in contact with a predetermined portion of the belt and rotating along with the belt.

3. The data input device for the portable terminal as claimed in claim 1, wherein the serrated belt pulley has a rotation shaft which is integrally assembled with the elastic sliding unit so as to move along with the elastic sliding unit.

4. The data input device for the portable terminal as claimed in claim 1, wherein the elastic sliding unit comprises a slider which is received into upper and lower cases to move reciprocally, and integrally assembled with the serrated belt pulley so as to move along with the serrated belt pulley when the rotation body is pressed; a shaft unit which is integrally coupled to the slider so as to extend in a sliding direction of the slider, for pressing the second switch unit when the rotation body is pressed; and an elastic body which is arranged in the shaft unit, for returning the slider to an initial position.

5. The data input device for the portable terminal as claimed in claim 1, wherein the elastic sliding unit is mounted to be vertically symmetric about the holding unit.

6. The data input device for the portable terminal as claimed in claim 1, wherein the rotation body is pressed in a radial direction of the serrated belt pulley.

7. A data input device for a portable terminal, the device comprising:
 first data input means mounted on a predetermined position of a side surface of a main body of the portable terminal so that a portion of the first data input means is exposed to the outside of the portable terminal, and operating when the exposed portion is rotated;
 second data input means operating when the exposed portion is pressed;
 a holding unit for maintaining a stopped state of the first data input means; and an elastic sliding unit for returning the second data input means to an initial position, wherein the holding unit comprises a serrated belt pulley in contact with an interior of a rotation body to move along with the rotation body depending on movement of the rotation body and having multiple openings formed in an upper surface of a serrated belt pulley at equal intervals along an outer peripheral surface of the serrated belt pulley; at least one spring module in contact with the serrated belt pulley while being parallel to the serrated belt pulley's axis of rotation and opposed to the openings, said at least one spring module being coupled with one of the openings to maintain a stopped state of the rotation body at a certain interval.

8. The data input device for the portable terminal as claimed in claim 7, wherein the second data input means operates in a direction into the main body.

9. The data input device for the portable terminal as claimed in claim 7, wherein the holding unit provides auditory information regarding operation of the first data input means.

* * * * *